United States Patent [19]
Sabagonis

[11] 3,841,013
[45] Oct. 15, 1974

[54] FISHING ACCESSORY
[76] Inventor: Walter J. Sabagonis, 1 Aleda Dr., Auburn, Mass. 01501
[22] Filed: Feb. 5, 1973
[21] Appl. No.: 329,457

[52] U.S. Cl. .............................................. 43/43.15
[51] Int. Cl. ............................................ A01k 97/00
[58] Field of Search ........................... 43/43.15, 43.1

[56] References Cited
UNITED STATES PATENTS
| | | | |
|---|---|---|---|
| 2,710,480 | 6/1955 | Gehrig | 43/43.15 |
| 2,766,547 | 10/1956 | Gallagher | 43/43.15 |
| 2,814,151 | 11/1957 | Knapton | 43/43.15 |
| 2,952,937 | 9/1960 | Wassing | 43/43.15 |
| 3,372,508 | 3/1968 | Maglinger | 43/43.15 |

Primary Examiner—Warner H. Camp
Attorney, Agent, or Firm—Norman S. Blodgett; Gerry A. Blodgett

[57] ABSTRACT

A fishing accessory for positioning live or natural bait at a point above the bottom, consisting of an elongated buoyant body, a weight and line fastener on one end of this body and a hook on the other end. The body is intended to position the bait and is camouflaged, so that it is not obvious to the fish.

1 Claim, 2 Drawing Figures

PATENTED OCT 15 1974  3,841,013
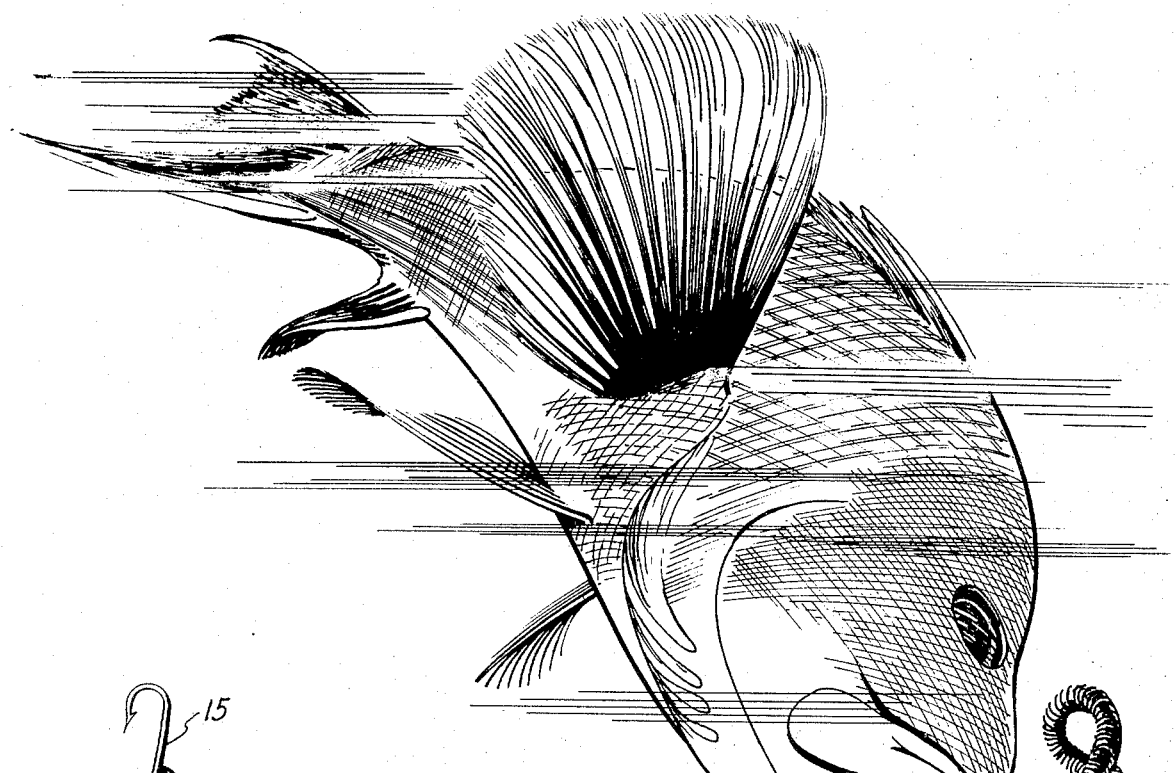
FIG. 1
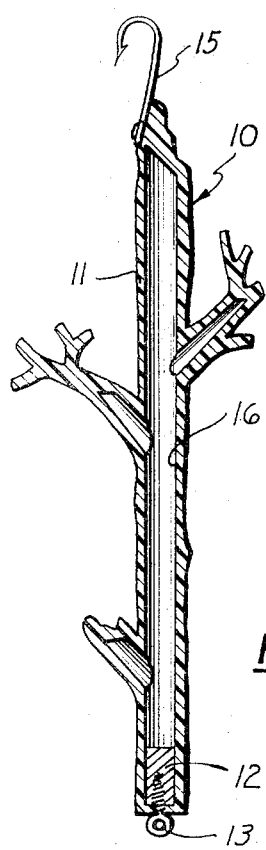
FIG. 2
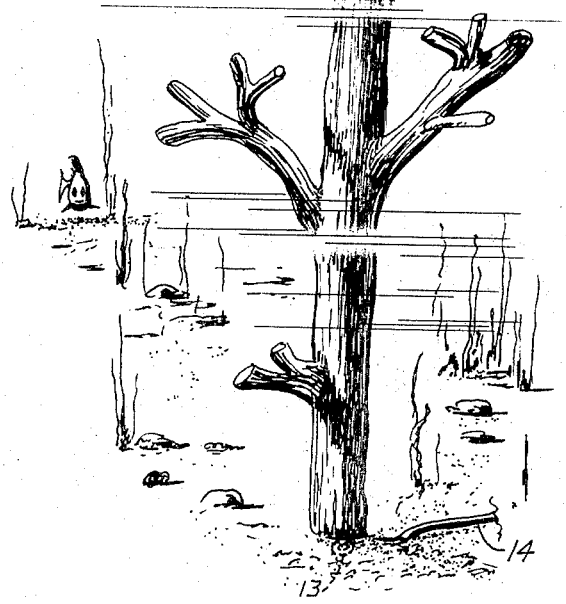

FISHING ACCESSORY

BACKGROUND OF THE INVENTION

Sports fishing is a hobby which occupies the spare time of millions of people. To additional millions, fishing is a primary means of making a living. Around this activity, a weekend subculture has developed with its own language, customs, and fads. One of the more obvious movements in sports fishing was the trend away from live bait and toward artificial lures. Lures, in addition to being more convenient to use, are designed with spinners and flashers and shimmering elements that look like the sort of thing that a fish would find attractive. Questions about the relative effectiveness of lures has prompted a large scale return from lures to natural bait, the thought being that the lures attract more fisherman than fish.

Among the many problems involved in the use of live bait, is proper positioning. Many popular fish feed in the vegetation near the bottom. Weighting the bait is necessary to get it near the bottom, but, of course, the weight usually places the bait on the bottom. The low buoyancy of most live bait and the lack of brilliant color or reflection result in invisibility of the bait as it rests in and among the gravel and silt on the bottom. Attempts to hang the bait from a surface float or float it from the bottom results in poor positioning and visible hardware that scares away the instinctively cautious fish.

These and other difficulties experienced with the prior art devices have been obviated in a novel manner by the present invention.

It is, therefore, an outstanding object of the invention to provide a fishing accessory for presenting natural bait in an effective manner.

Another object of this invention is the provision of a fishing accessory which positions the natural bait a slight distance from the bottom.

A further object of the present invention is the provision of a fishing accessory which does not allow the bait to become indistinguishable from the gravel and weed of the bottom.

It is another object of the instant invention to provide a fishing accessory which is camouflaged and designed so that it does not frighten the fish or reduce the attraction of the bait.

A still further object of the invention is the provision of a fishing accessory which is easy to use, inexpensive to manufacture, and capable of a long life of useful service.

SUMMARY OF THE INVENTION

In general, the invention involves a fishing accessory intended to position natural bait slightly off the bottom of the water body. It includes an elongated buoyant body, a hook for holding live bait located at one end of the body and a weight located at the other end of the body. The fishing line is attached to the weighted end. The body is of such shape and color that it is camouflaged, and resembles the surrounding natural objects.

BRIEF DESCRIPTION OF THE DRAWINGS

The character of the invention, however, may be best understood by reference to one of its structural forms, as illustrated by the accompanying drawings, in which:

FIG. 1 shows a lure embodying the principle of the present invention, and

FIG. 2 is a sectional view of the lure.

DESCRIPTION OF THE PREFERRED EMBODIMENT

Referring to FIG. 1 of the drawings representing an aquatic scene, wherein are best shown the general features of the present invention, the fishing accessory 10 is shown as having an elongated body 11 with a hook 15 at one end and a weight 12 at the other.

The elongated body 11 is formed to appear as an innocuous natural object. In this case the appearance of a driftwood twig is used, but other types of marine vegetation would be suitable. The body is formed of plastic and made buoyant by enclosed air pockets within.

The weight 12 is attached to one end and is sufficient to overcome the buoyancy of the body. At the same end is attached a ring 13 to which the line 14 is attached.

The opposite end of the body carries a hook 15 on which bait 17 is attached. Any sort of bait can be used here but various kinds of worms and fish eggs are best because, being held out into the water, the turbulent water imparts motion to the bait.

As is evident in FIG. 2, the lure is formed of plastic with a hollow interior cavity 16. The lead weight 12 is located in the cavity and the ring 13 is screwed into it.

The operation of the present invention will now be readily understood in view of the above description. The device is tied to the end of a conventional fishing line 14 by ring 13. Bait (such as a sea worm) is placed on the hook 15. The unit is cast into the water. It sinks to the bottom, because of the weight 12, but is held upright because of the buoyancy of the body. In this way, the bait 17 is held up into the water where turbulence and the improved visibility of the bait make it a tempting attraction for fish. Because the body appears like a piece of debris, it neither scares the fish nor detracts from the bait.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A fishing accessory for effective presentation of natural bait on a fishing line, comprising:
    a. an elongated buoyant body, the body being formed of plastic with a hollow interior cavity, the body having a first end and a second end, the body being shaped and colored to resemble a natural object having a main stalk and secondary branches so as to be camouflaged in a marine bottom environment,
    b. a weight fixed to the first end, being of sufficient mass to defeat the buoyancy of the body, the weight being entirely enclosed in the cavity at the said one end thereof, c. means for attaching the line to the first end, the means being attached to the weight to maintain it at the said one end, and d. a hook fixed to the second end and adapted to carry bait.

* * * * *